(12) United States Patent
Okamoto (10) Patent No.: US 10,948,632 B2
(45) Date of Patent: Mar. 16, 2021

(54) LIGHT BEAM DIRECTION CONTROL ELEMENT AND DISPLAY APPARATUS

(71) Applicant: NLT TECHNOLOGIES, LTD., Kanagawa (JP)

(72) Inventor: Mamoru Okamoto, Kawasaki (JP)

(73) Assignee: TIANMA MICROELECTRONICS CO., LTD., Chenzhen (CN)

( * ) Notice: Subject to any disclaimer, the term of this patent is extended or adjusted under 35 U.S.C. 154(b) by 48 days.

(21) Appl. No.: 15/540,601

(22) PCT Filed: Feb. 23, 2015

(86) PCT No.: PCT/JP2015/054951
§ 371 (c)(1),
(2) Date: Jun. 29, 2017

(87) PCT Pub. No.: WO2016/135811
PCT Pub. Date: Sep. 1, 2016

(65) Prior Publication Data
US 2017/0371077 A1   Dec. 28, 2017

(51) Int. Cl.
*G02B 5/00* (2006.01)
*G02F 1/1335* (2006.01)
*G02B 7/00* (2006.01)

(52) U.S. Cl.
CPC .......... *G02B 5/003* (2013.01); *G02B 7/008* (2013.01); *G02F 1/133512* (2013.01); *G02F 1/133524* (2013.01); *G02B 2207/123* (2013.01)

(58) Field of Classification Search
CPC ........ G02B 5/00; G02B 5/003; G02B 5/0278; G02B 5/201; G02B 7/008;
(Continued)

(56) References Cited

U.S. PATENT DOCUMENTS 5,254,388 A   10/1993 Melby et al.
2007/0268586 A1   11/2007 Mimura et al.
(Continued)

FOREIGN PATENT DOCUMENTS

JP   50-092751 A   7/1975
JP   06-504627 A   5/1994
(Continued)

OTHER PUBLICATIONS

International Search Report of PCT/JP2015/054951 dated Apr. 7, 2015.

*Primary Examiner* — Thomas K Pham
*Assistant Examiner* — Mitchell T Oestreich
(74) *Attorney, Agent, or Firm* — Sughrue Mion, PLLC (57) ABSTRACT

In a light beam direction control element having: light transmitting regions made of light transmitting material arrayed on a substrate; and a light absorbing region made of light absorbent material filling a gap between the light transmitting regions, the light absorbing region restricting a light beam direction of light passing through the substrate, the light absorbing region extends in first and second directions that form a right angle to each other in a substrate plane. The light beam direction control element further has: a crossing portion where the light absorbing region extending in the first direction and the light absorbing region extending in the second direction cross each other to form an L or T shape; and at least one structure dividing the light absorbing region, located on a region which is other than the crossing portion and where the light absorbing region extends in the first or second directions.

4 Claims, 8 Drawing Sheets

(58) Field of Classification Search
CPC .......... G02B 2207/123; G02B 27/0018; G02F
1/1323; G02F 1/133512; G02F 1/133524;
G02F 1/133606; G02F 1/136209; G02F
2001/133607; G02F 1/122524; F21V
11/06; Y10T 428/24182; Y10T
428/24537; Y10T 428/2457
USPC .................. 359/599, 614, 885, 893; 345/84;
428/120, 163, 167
See application file for complete search history.

(56) References Cited

U.S. PATENT DOCUMENTS

| | | | |
|---|---|---|---|
| 2008/0079866 A1* | 4/2008 | Mimura | ............ G02F 1/133524 |
| | | | 349/61 |
| 2008/0080040 A1 | 4/2008 | Mimura et al. | |
| 2008/0144179 A1 | 6/2008 | Mimura et al. | |
| 2010/0328778 A1 | 12/2010 | Mimura et al. | |
| 2011/0085096 A1* | 4/2011 | Mimura | ............ G02F 1/133524 |
| | | | 349/24 |

FOREIGN PATENT DOCUMENTS

| | | |
|---|---|---|
| JP | 2007-272065 A | 10/2007 |
| JP | 2007-334279 A | 12/2007 |
| JP | 2008-089727 A | 4/2008 |
| JP | 2008-107404 A | 5/2008 |
| JP | 2008-152017 A | 7/2008 |
| JP | 2013-190608 A | 9/2013 |
| WO | 92/11549 A1 | 7/1992 |

\* cited by examiner

CLOSED ARRANGEMENT OF
LIGHT ABSORBING REGION

DIRECTION OF
SHRINKAGE GENERATION

FIG.12D
RELATED ART

DIRECTION OF SHRINKAGE GENERATION

DIRECTION OF SHRINKAGE GENERATION

FIG.12E
RELATED ART

DIRECTION OF SHRINKAGE GENERATION

LIGHT BEAM DIRECTION CONTROL ELEMENT AND DISPLAY APPARATUS

CROSS-REFERENCE TO RELATED APPLICATIONS

This application is the national phase under 35 U.S.C. § 371 of PCT International Application No. PCT/JP2015/054951 which has an International filing date of Feb. 23, 2015 and designated the United States of America.

FIELD

The present invention relates to a light beam direction control element (microlouver) that controls the directionality of emitted light, and to a display apparatus having the light beam direction control element.

BACKGROUND

In recent years, liquid crystal display apparatuses have widely been employed as display apparatuses for a variety of device such as flat panel televisions, personal digital assistants (PDA), notebook personal computers and so forth. In particular, a mobile information terminal which is easy to carry around may be used in a situation where a display screen of the mobile information terminal is shared by more than one person in a meeting or the like, or in a situation where information is inputted at a public place such as inside a train or an airplane. As such, the mobile information terminal is used under various environmental conditions.

Here, under the environment of sharing as in the former example, the screen of a mobile information terminal preferably has a viewing angle as wide as possible in order for more than one person to share the display screen. On the other hand, when used in a public place as in the latter example, others may peep the screen when the viewing angle thereof is too wide, which hinders information conservation or privacy protection. Thus, under such environment of use, the viewing angle may desirably fall within such a range that only the user is able to see the screen.

In order to respond to such needs, a microlouver film is employed that controls the spread of light emitted from a light source or a display apparatus. The microlouver film has a structure in which light absorbing louvers are disposed at equal intervals on a film surface. Each of the louvers has a certain height with respect to a direction perpendicular to the film surface. Thus, incident light beams substantially parallel to the orientation of the louvers, or light beams entering substantially perpendicular to the film surface, may transmit through the louver. However, light entering at a large angle with respect to the orientation of the louvers or light entering obliquely to the film surface is absorbed by the louvers and thus cannot transmit therethrough. Examples of the method of fabricating such a microlouver film are disclosed in Japanese Patent Application Laid-Open Publication No. S50-92751, Japanese Patent No. 3043069, Japanese Patent Application Laid-Open Publication No. 2007-272065, Japanese Patent Application Laid-Open Publication No. 2008-89727 and Japanese Patent Application Laid-Open Publication No. 2008-152017.

Each of Japanese Patent Application Laid-Open Publication No. S50-92751 and Japanese Patent No. 3043069 discloses a method of fabricating a microlouver film by alternately layering a transparent film and a light-absorbent thin film, melting and crimping the layered films to form a block with a desired thickness, and slicing the block along a direction perpendicular to the layered surface. Japanese Patent Application Laid-Open Publication No. 2007-272065 discloses a microlouver film having a function of controlling a viewing angle in multiple directions by one film using an injection molding device, and a manufacturing method thereof. Japanese Patent Application Laid-Open Publication No. 2008-89727 discloses a method of manufacturing a microlouver film by forming transparent patterns (patterned transparent photosensitive resin material) serving as light transmitting regions on a transparent substrate by a photolithography process, and filling a gap portion between the transparent patterns with light-absorbent fluid and curing the fluid to form a light absorbing region. It also discloses a technique of suppressing the occurrence of Moire fringes associated with a phase difference in spatial frequency between the display panel and the microlouver film by optimizing the arrangement cycle of the light transmitting region and the light absorbing region. Furthermore, Japanese Patent Application Laid-Open Publication No. 2008-152017 proposes an adhesive layer, which is used in layering different members constituting a liquid crystal panel, being provided with a louver function. That is, an adhesive optical filter is disclosed in which the adhesive layer is layered over one surface of a translucent sheet-like base material while having multiple light absorbing regions and multiple translucent regions that are substantially perpendicular to the layer interface between the translucent sheet-like base material and the adhesive layer.

SUMMARY

The conventional techniques described above, however, have several problems.

The first problem is that the direction and angle for restricting the spreading of light are limited. With the techniques described in Japanese Patent Application Laid-Open Publication No. S50-92751 and Japanese Patent No. 3043069, a block is formed by alternately layering the transparent film and a thin film having light absorbency, resulting that a plane formed by slicing in a direction perpendicular to the layer surface is fabricated only with a linear pattern where the light transmitting region and the light absorbing region are alternately repeated. This means that the spreading of light may only be controlled in either one of the left-right and up-down directions. As a method of solving this problem, two microlouvers are layered while being displaced from each other by 90 degrees so as to restrict the spreading of light in both of the up-down and left-light directions. With this method, however, the thickness of the film is increased as a whole, since at least two microlouvers are used. While the microlouver according to Japanese Patent Application Laid-Open Publication No. 2007-272065 is able to control the viewing angle in two directions, i.e. up-down and left-right directions, with one microlouver, miniaturization is more difficult in terms of the width or depth of the light absorbing region compared to the case using the photolithography process, because a manufacturing method by an injection molding device using a metal mold or the like is employed therefor.

The second problem is long manufacturing tact time, resulting in poor productivity. The microlouver according to an embodiment described in Japanese Patent Application Laid-Open Publication No. 2008-89727 is manufactured by a manufacturing method including: a transparent pattern forming step of forming a transparent pattern by placing light transmitting material serving as a light transmitting region on one transparent substrate to form transparent patterns by the photolithography process; a substrate layering step of superposing another transparent substrate onto protrusions of the transparent patterns while being in close contact with the protrusions; and a fluid filling step of filling a gap portion between the transparent patterns with curable light absorbent fluid serving as a light absorbing region. In such a case, filling of the light absorbent fluid is performed by making use of capillarity, which requires a long period of time before the entire gap portion is filled under the atmosphere. Moreover, the equipment specification is rather expensive when the filling is performed under the vacuum or reduced pressure, and also the manufacturing tact time is elongated since the reduced pressure state and the atmospheric state are alternately repeated. Furthermore, in Japanese Patent Application Laid-Open Publication No. 2008-152017, the filter is manufactured by a method of utilizing a laser-light-sensitive adhesive sheet that changes color when irradiated with laser light and partially irradiating the sheet with laser light by scanning or using a mask, thereby causing a problem of increased size and cost of the manufacturing equipment and also of an insufficient light-shielding ability of a discolored portion that is supposed to be responsible for light absorbency.

Figure 12A:
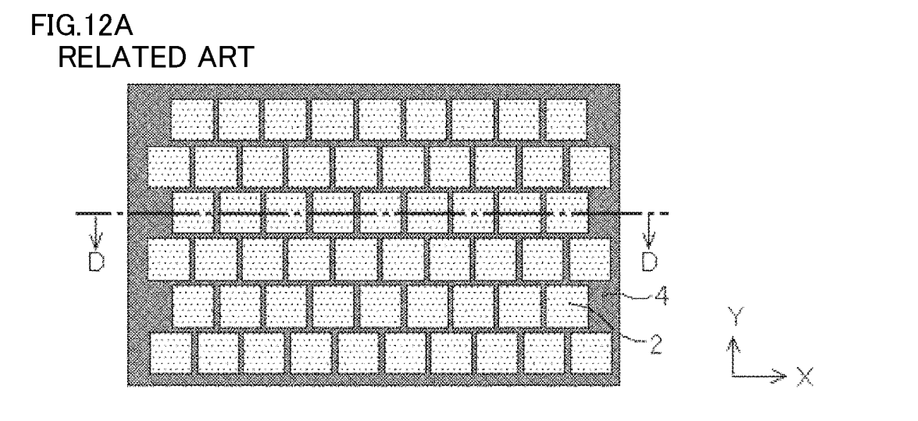
FIG. 12A is a top view illustrating an example of the configuration of the conventional light beam direction control element.
Figure 12B:
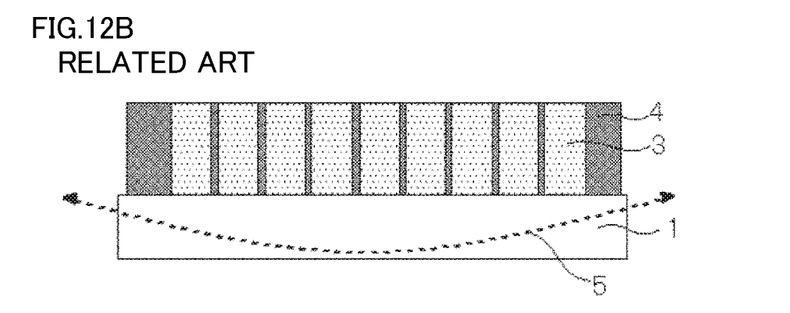
FIG. 12B is a section view along D-D illustrating an example of the configuration of the conventional light beam direction control element.
Figure 12C:
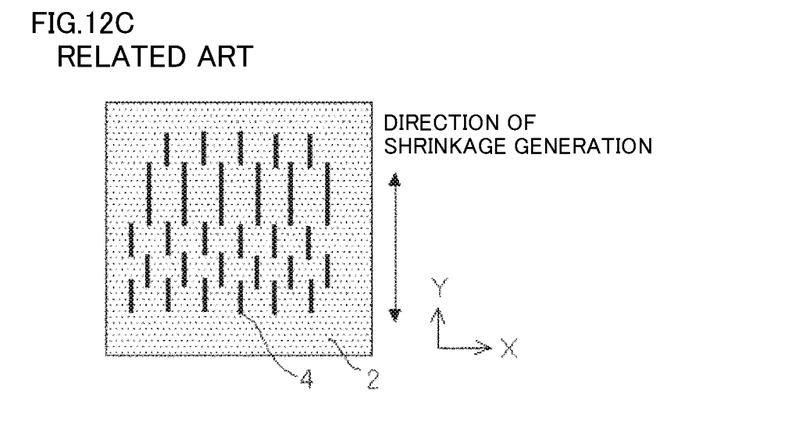
FIG. 12C is a top view illustrating an example of the configuration of the conventional light beam direction control element.
Figure 12D:
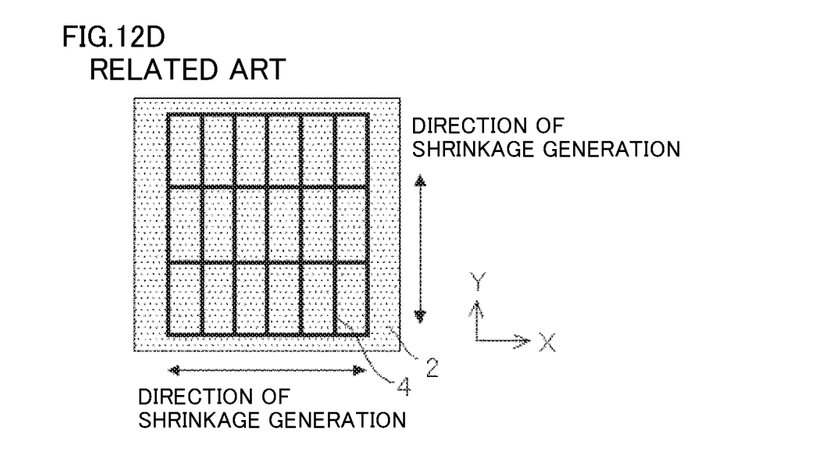
FIG. 12D is a top view illustrating an example of the configuration of the conventional light beam direction control element.
Figure 12E:
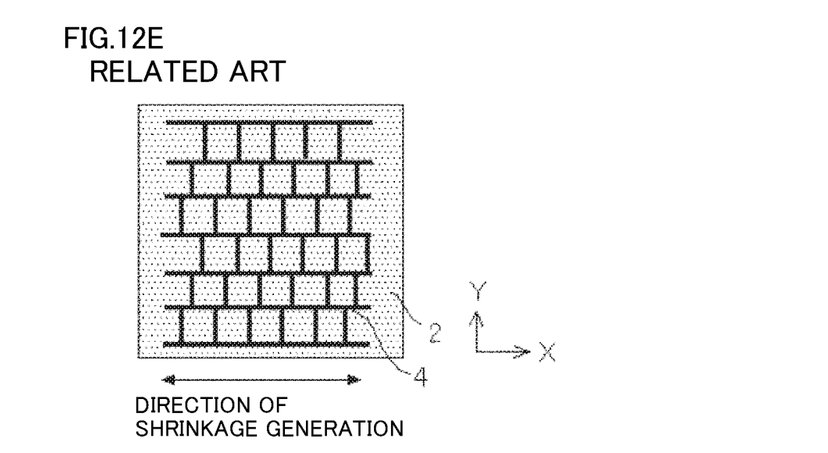
FIG. 12E is a top view illustrating an example of the configuration of the conventional light beam direction control element.

The third problem is that a warp occurs in the microlouver. As illustrated in FIGS. 12A and 12B, the microlouver according to another embodiment described in Japanese Patent Application Laid-Open Publication No. 2008-89727 is manufactured by a manufacturing method including: a transparent pattern forming step of forming transparent patterns 3 serving as light transmitting regions 2 on a transparent substrate 1; a fluid filling step of filling with light absorbent fluid serving as a light absorbing region 4; and a fluid curing step of curing the light absorbent fluid used for filling to form the light absorbing region 4. Here, the light absorbent fluid used for filling the gap portion between the transparent patterns 3 is cured by ultraviolet rays or heat before layering and bonding with the other transparent substrate, so that the light absorbent fluid itself shrinks, causing a warp 5 of a concave shape, with its film surface facing up, in the transparent substrate 1. Also in the case where the light transmitting region 2 and the light absorbing region 4 are periodically arranged as shown in FIGS. 12C, 12D and 12E described in Japanese Patent Application Laid-Open Publication No. 2008-89727, the arrangement of the light absorbing region 4 has a directional characteristic in a specific direction (X or Y direction), and therefore shrinkage due to heat or light is accumulated in the specific direction, resulting in the occurrence of a warp. Furthermore, even in the case of the periodical arrangement of a hexagonal honeycomb shape as disclosed in Japanese Patent Application Laid-Open Publication No. 2008-152017, the accumulation of a warp due to shrinkage of the light absorbing region develops in various degrees. In order to effectively suppress the accumulation of shrinkage of the light absorbing region, it is necessary to periodically form a shape such as an L-shape or a T-shape for once holding back the accumulation of shrinkage, not forming a Y-shape such as the hexagonal honeycomb.

The fourth problem is that the adhesive force of a microlouver constituting layer is weak, causing poor reliability of the microlouver. As described in the third problem, since the microlouver (FIGS. 12A, 12B) described in Japanese Patent Application Laid-Open Publication No. 2008-89727 has a warp 5 occurring in the transparent substrate 1 with the light transmitting regions 2 and the light absorbing region 4, the adhesive force is lowered due to the stress of a warp when another transparent substrate is layered and bonded with the other transparent substrate, posing an underlying risk of breaking the microlouver film in an extreme case.

The present invention has been made in view of the problems described above, and aims to attain a light beam direction control element (microlouver) that suppresses a warp due to thermal shrinkage of the light absorbent material and enhances the adhesion force between the transparent substrates to improve the reliability without reducing the productivity, and a display apparatus having the light beam direction control element.

In a light beam direction control element according to the present invention having light transmitting regions made of light transmitting material arrayed on a substrate and a light absorbing region made of light absorbent material filling a gap between the light transmitting regions, the light absorbing region restricting a light beam direction of light passing through the substrate, the light absorbing region extends in a first direction and a second direction forming a right angle to each other in a substrate plane, and the light beam direction control element has a crossing portion where the light absorbing region extending in the first direction and the light absorbing region extending in the second direction cross each other to form an L-shape or a T-shape, at least one structure dividing the light absorbing region located on a region which is other than the crossing portion and where the light absorbing region extends in the first direction or the second direction.

Furthermore, in a display apparatus according to the present invention, the light beam direction control element is located on a front face or a rear face of a display panel.

According to the present invention, it is possible to attain a light beam direction control element that suppresses a warp due to thermal shrinkage of light absorbent material and enhances the adhesion force between the transparent substrates to improve the reliability without reducing the productivity, and a display apparatus having the light beam direction control element.

DETAILED DESCRIPTION

Preferred embodiments of the present invention will be described below with reference to the drawings.

Embodiment 1

Figure 1:
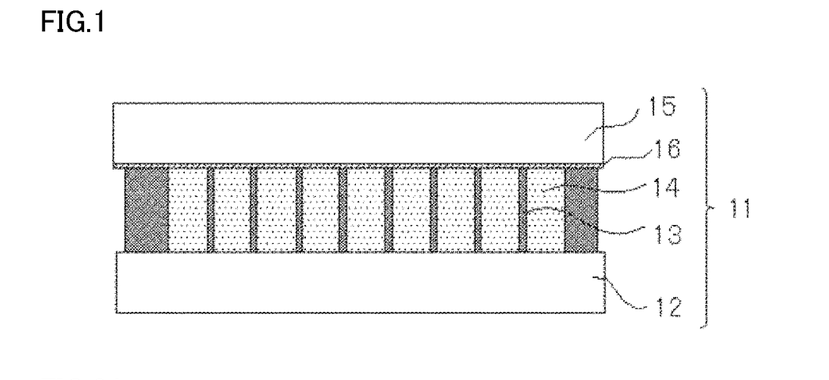
FIG. 1 is a section view illustrating the structure of a light beam direction control element according to the first embodiment of the present invention.
Figure 2A:
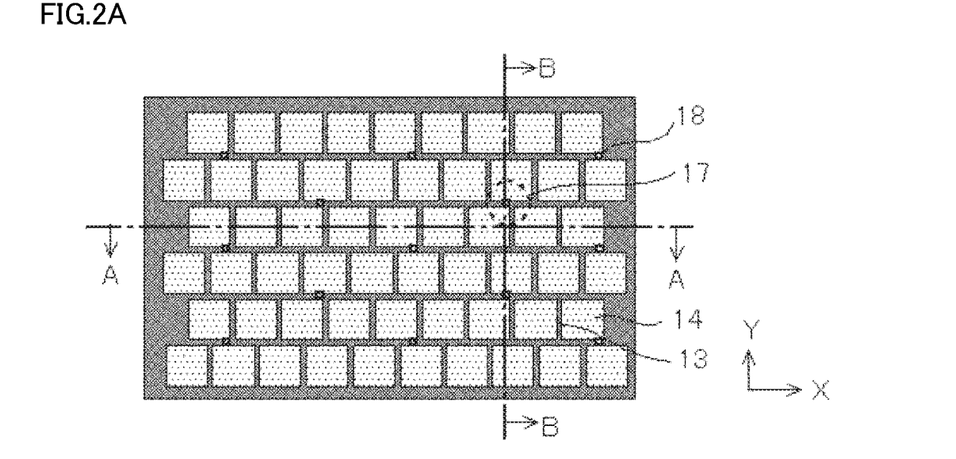
FIG. 2A is a top view illustrating the arrangement of the light absorbing region in the light beam direction control element shown in FIG. 1.
Figure 2B:
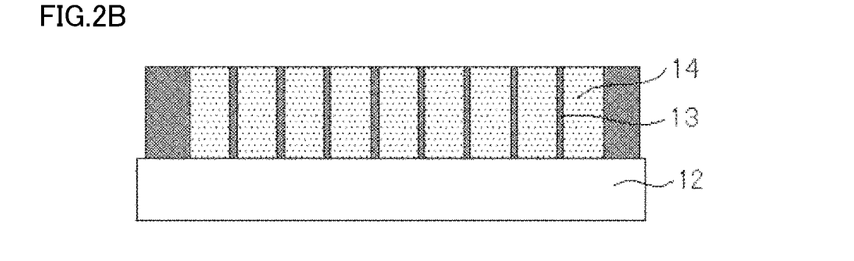
FIG. 2B is a section view along A-A illustrating the arrangement of the light absorbing region in the light beam direction control element shown in FIG. 1.
Figure 2C:
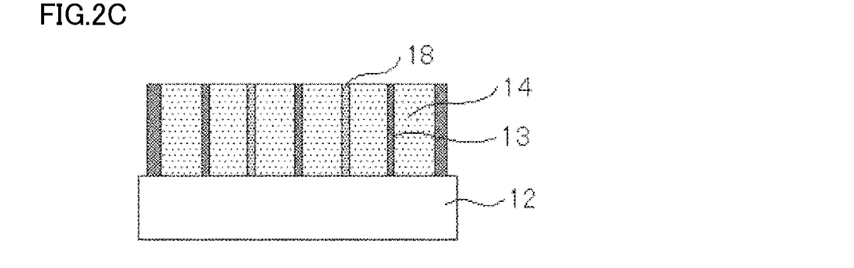
FIG. 2C is a section view along B-B illustrating the arrangement of the light absorbing region in the light beam direction control element shown in FIG. 1.

FIG. 1 is a section view illustrating the structure of a light beam direction control element (microlouver) according to the first embodiment of the present invention. FIG. 2A is a plan view of the light beam direction control element, FIG. 2B is a section view along the line A-A, and FIG. 2C is a section view along the line B-B. A light beam direction control element 11 according to the present embodiment is so configured that a light absorbing region 13 made of light absorbent material and a light transmitting region 14 made of light transmitting material are alternately disposed on a transparent substrate 12 (has light transmitting regions 14 arrayed on a transparent substrate 12 and the light absorbing region 13 filling gaps between the light transmitting regions 14), and another transparent substrate 15 is layered over and bonded with the transparent substrate 12 through an adhesive 16.

In the light beam direction control element 11, of the light entered the light transmitting region 14 through the transparent substrate 12 or transparent substrate 15, light with a small incident angle, i.e. light substantially perpendicular to the substrate plane, passes through the light transmitting region 14, while light with a large incident angle is absorbed into the light absorbing region 13. Accordingly, the light absorbing region 13 functions as a louver that restricts the light beam direction of emitted light, and can restrict the angle distribution of incident light that can pass through by letting the light pass the light beam direction control element 11.

In the light beam direction control element 11, the restriction range of the angle distribution of incident light that can pass through is determined by the refractive index of the material forming the light transmitting region 14 and the aspect ratio of the transparent pattern of the light transmitting region 14. For example, assuming that the refractive index of the light transmitting region 14 is 1.5, the width of the light transmitting region 14 is 30 μm, the height of the light transmitting region 14 is 90 μm and the width of the light absorbing region 13 is 5 μm, the aspect ratio of the transparent pattern will be 3, making it possible to restrict the passing of incident light inclined by 30 degrees or more relative to the normal direction of the substrate plane. In order to increase the restriction for the angle distribution of incident light that can pass through, basically, the aspect ratio of the transparent pattern may be increased. In order to increase the transmittance of the incident light passing in the direction perpendicular to the substrate plane without being affected by the restriction for the angle distribution, the width of the light absorbing region 13 may be narrowed.

Moreover, the adhesive 16 is made of thermally curable transparent material, and has a film thickness of approximately 5 to 10 μm. It is noted that the film thickness is preferably thin in terms of enhancement in the transmittance of incident light for the adhesive 16. Since the adhesive 16 covers the entire upper surfaces of the light transmitting region 14 as well as light absorbing region 13 to secure the maximum adhesion area, the transparent substrate 12 and transparent substrate 15 may be held together by strong adhesive force.

Figure 3:
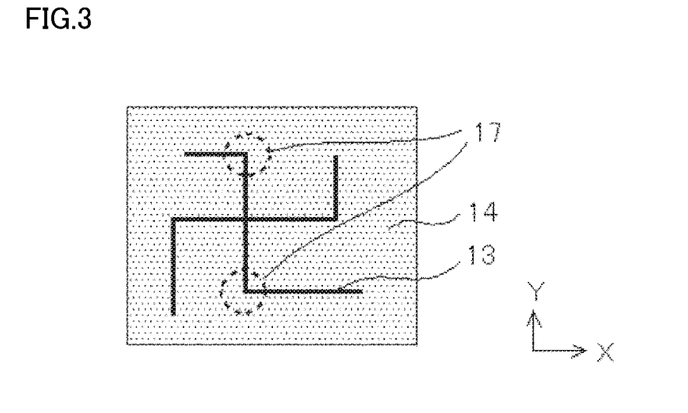
FIG. 3 is a plan view illustrating the minimum configuration of the array form of the light absorbing region shown in FIG. 2A.

A characteristic of the present invention is the arrangement pattern of the light absorbing regions 13 (or the pattern of gaps between the light transmitting regions 14) in the light beam direction control element 11 as illustrated in FIG. 2A. The light absorbing region 13 extends in the X direction (first direction) and Y direction (second direction) on the transparent substrate 12 while having at least two or more bent parts 17 (L-shaped or T-shaped crossing portion), and structures 18 dividing the light absorbing region 13 are located on a region which is other than the bent parts 17 (crossing portions) and where the light absorbing region extends in the first direction or the second direction by filling gaps between the light transmitting regions 14, as illustrated in FIG. 2A. The structure 18 serving as the base for the bent part 17 is formed by utilizing the transparent pattern of the light transmitting region 14. In other words, the light absorbing region 13 formed on the transparent substrate 12 is divided by the structure 18 so as not to be in one linear array (in a shape extending as one straight line) relative to the X direction, and also is divided by the light transmitting region 14 so as not to be in one linear array relative to the Y direction. That is, with respect to the Y direction, the light transmitting region 14 itself serves as a structure for dividing. Furthermore, at least one structure for dividing is included in a path on the transparent substrate 12 where the light absorbing region 13 extends. It is noted that the shape and size of the structure 18 is not limited to the form illustrated in FIGS. 2A to 2C as long as the structure 18 can divide the light absorbing region 13. FIG. 3 illustrates, among the array forms of the light absorbing regions 13, an example of the minimum configuration of the light absorbing region 13 divided by the structure 18 (configuration where the light absorbing region 13 having L-shaped bent part 17 is formed in the light transmitting region 14).

The manufacturing method of the light beam direction control element according to the present embodiment will now be described with reference to FIGS. 4A-4F.

Figure 4A:
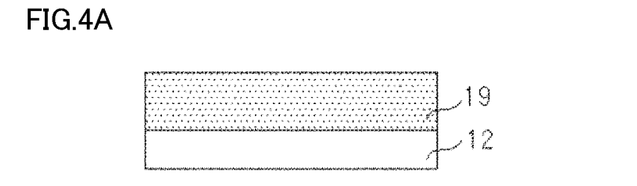
FIG. 4A is a section view illustrating a manufacturing method of the light beam direction control element shown in FIG. 1.

First, as illustrated in FIG. 4A, transparent photocurable material 19 which is transparent in a visible light region forming the light transmitting region 14 is applied onto the transparent substrate 12. The transparent substrate 12 may either be a glass substrate or film substrate of resin or the like that transmits light with the wavelength of at least 365 nm or larger therethrough. Moreover, examples of the method of applying the photocurable material 19 include a spin coating method, a bar coating method, a screen printing method, an inkjet printing method and so forth. Alternatively, dry film resist may be transferred onto the transparent substrate 12. As the photocurable material 19, material capable of patterning with the aspect ratio of approximately 3 or higher at the thickness of 100 μm, for example, is preferable. After the photocurable material 19 is applied, a prebaking process may be carried out using an oven or electric griddle. According to the present embodiment, a polyethylene terephthalate (PET) film having the thickness of 100 μm is used as the transparent substrate 12, chemically amplified photoresist (Trade name: SU-8) from Nippon Kayaku Co., Ltd. is used as the photocurable material 19, the bar coating method is employed to apply the photocurable material 19 to the thickness of 90 μm, and a prebaking process is carried out using an oven at 95° C. for 60 minutes.

Figure 4B:
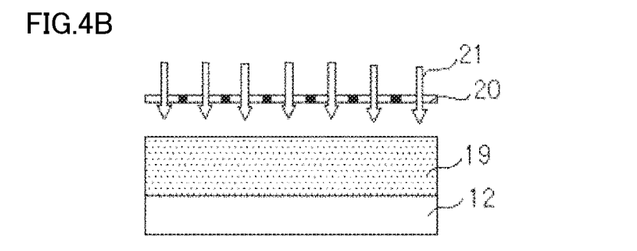
FIG. 4B is a section view illustrating a manufacturing method of the light beam direction control element shown in FIG. 1.

Subsequently, as illustrated in FIG. 4B, the photocurable material 19 formed on the transparent substrate 12 is exposed to ultraviolet rays 21 through a photomask 20 having desired opening patterns. Here, the ultraviolet rays 21 irradiate the transparent substrate surface from the direction perpendicular thereto. Accordingly, of the photocurable material 19, the portion irradiated with the ultraviolet rays 21 is cured, while the portion shielded from light by the photomask 20 remains uncured. Thereafter, a post baking process may also be carried out, if necessary. According to the present embodiment, irradiation with the ultraviolet rays having the wavelength of 365 nm is performed at the exposed amount of 350 mJ/cm$^2$, and the post baking process is carried out using an oven at 95° C. for 20 minutes. Here, in order to avoid the linear arrangement of the light absorbing region 13 in the X direction and Y direction (extending as one straight line) on the transparent substrate 12, the pattern of the structure 18 which is a base for bending the light absorbing region 13 is inserted in advance into the photomask 20. While the case was described where negative photoresist (photocurable material 19) is employed as the material of the light transmitting region 14, positive photoresist may alternatively be employed as the material of the light transmitting region 14. In such a case, a photomask with an opening pattern corresponding to a portion to be the light absorbing region 13 may be used.

Figure 4C:
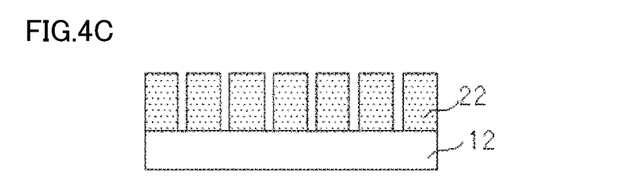
FIG. 4C is a section view illustrating a manufacturing method of the light beam direction control element shown in FIG. 1.

Subsequently, as illustrated in FIG. 4C, dedicated developing solution is used to perform a development process, uncured photocurable material 19 is removed, and thereafter a post baking process is carried out. As such, transparent patterns 22 with a high aspect ratio are formed on the transparent substrate 12 using the photolithography process, to complete light transmitting regions 14 of the light beam direction control element 11 (transparent pattern forming step). Here, the pattern of the structure 18 which is a base for bending the light absorbing region 13 is simultaneously formed. Therefore, the structure 18 may be made of the same material as the transparent patterns 22 forming the light transmitting regions 14 without increase in the number of manufacturing steps. According to the present embodiment, Propylene Glycol Monomethyl Ether Acetate (PGMEA) is used as the developing solution, spray development is used for the development scheme, and the post baking process is carried out at 120° C. for 30 minutes.

Figure 4D:
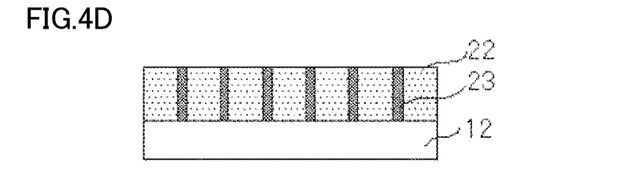
FIG. 4D is a section view illustrating a manufacturing method of the light beam direction control element shown in FIG. 1.

Subsequently, as illustrated in FIG. 4D, the light absorbent material 23 is applied to gaps between the transparent patterns 22, to form the light absorbing region 13 (light absorbent material forming step). As the light absorbent material 23, material having substantially the same refractive index as that of the transparent pattern 22 and the light shielding performance indicated by the optical density (OD) of 3 or higher, and further of a non-volatile (or low-volatile) solventless type is preferably employed. Examples of the method of applying the light absorbent material 23 include a bar coating method, a screen printing method and an inkjet printing method, while the screen printing method is preferable that can effectively fill the gap in the depth direction between the transparent patterns 22 with only a required amount of the light absorbent material 23 without catching up an air bubble into the gap. This screen printing also has a characteristic that is capable of easily controlling the amount of application across a large area depending on the mesh shape or depth of a screen plate to be used. According to the present embodiment, the light absorbent material 23 formed by scattering carbon black on epoxy-based resin having the same refractive index as that of SU-8, i.e. 1.55 is used, and screen printing is employed for the application method, while the light absorbent material 23 remaining at the head of the transparent pattern 22 is wiped off with a waste cloth, and a baking process is carried out in an oven at 80° C. for 30 minutes.

Figure 4E:
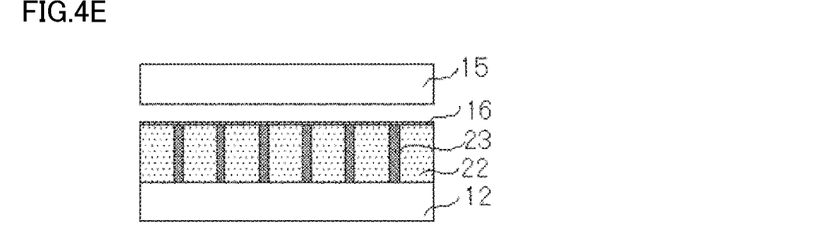
FIG. 4E is a section view illustrating a manufacturing method of the light beam direction control element shown in FIG. 1.

Subsequently, as illustrated in FIG. 4E, an adhesive 16 is applied and formed on the entire upper surfaces of the transparent patterns 22 and the light absorbent material 23 (adhesive forming step). As the adhesive 16, it is desirable to use transparent resin material having substantially the same refractive index as that of the material type used for the transparent patterns 22 and the light absorbent material 23. As for the application method, a bar coating method, a screen printing method or the like may be employed when the adhesive is in a liquid form, whereas a laminating method or the like may be employed when the adhesive is in a sheet form. According to the present embodiment, epoxy-based resin is used as the adhesive 16, the screen printing method is employed as the application method, and the thickness of 10 μm is employed for the adhesive 16. In the screen printing method, adhesive with a relatively high degree of viscosity may be applied by printing, which suppresses shear drop at the edge of the adhesive forming region and thus may easily control the edge to be linear. Here, it is understood that the application and forming of the adhesive 16 is carried out while holding a target of the application in a horizontal manner using a suction stage, a tension guide, a heating stage or the like.

Figure 4F:
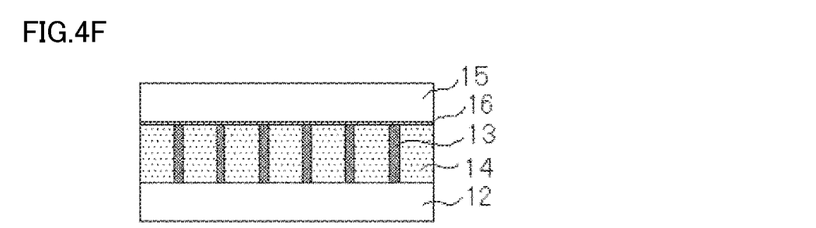
FIG. 4F is a section view illustrating a manufacturing method of the light beam direction control element shown in FIG. 1.

Subsequently, as illustrated in FIG. 4F, another transparent substrate 15 is placed over and bonded with the substrate of FIG. 4E that has been through up to the adhesive forming step (substrate bonding step), and thereafter a baking process is performed in an oven at 90° C. for 10 minutes in order to cure the adhesive 16.

As described above, in the manufacturing method according to the present embodiment, the transparent patterns 22 serving as the light transmitting regions 14 and the pattern of the structure 18 for dividing the light absorbing region 13 that is a base for bending the light absorbing region 13 are formed in the same step, and gaps between the patterns are filled with the light absorbent material 23. Thus, the stress due to thermal shrinkage of the light absorbent material 23 may be distributed in the X and Y directions starting from the pattern of the structure 18, instead of being concentrated and accumulated in a specific linear direction (X or Y direction). As a result, the occurrence of a warp in the transparent substrate 12 may be suppressed, increasing the adhesion force between transparent substrates and thus enhancing the reliability of the light beam direction control element.

Embodiment 2

The second embodiment of the present invention will now be described with reference to FIGS. 5A and 5B. The light beam direction control element according to the second embodiment is similar to the light beam direction control element according to the first embodiment illustrated in FIGS. 1 to 3, while the shapes and arrangement patterns of the light transmitting regions 14 are changed in order to bend the light absorbing region 13.

Figure 5A:
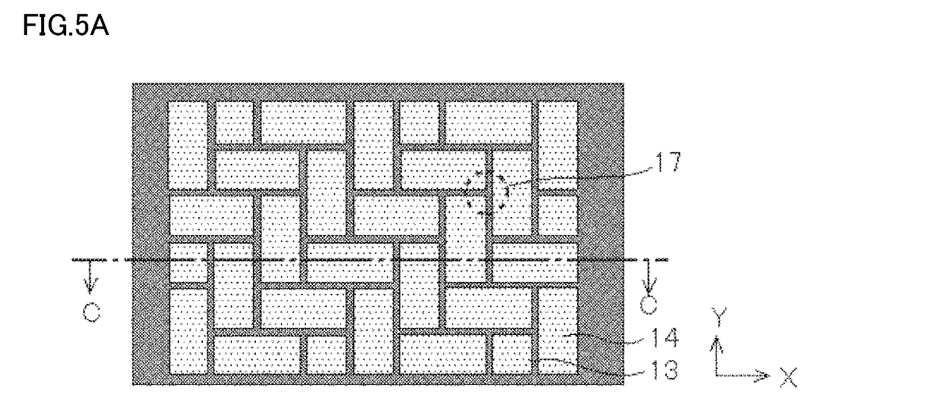
FIG. 5A is a top view illustrating the arrangement of a light absorbing region in a light beam direction control element according to the second embodiment of the present invention.
Figure 5B:
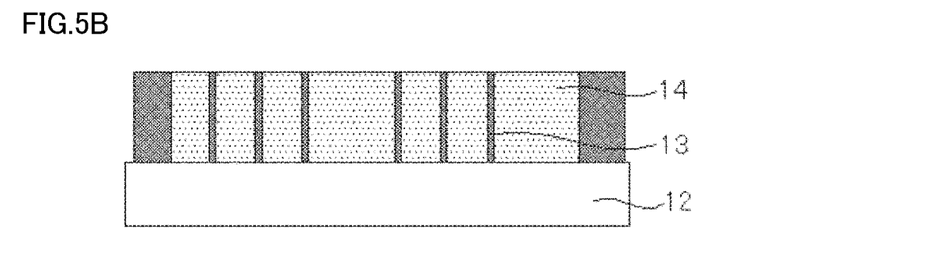
FIG. 5B is a section view along C-C illustrating the arrangement of the light absorbing region in the light beam direction control element according to the second embodiment of the present invention.

FIG. 5A is a plan view of the light beam direction control element according to the second embodiment, and FIG. 5B is a section view along the line C-C. The present embodiment is characterized in that patterns of different shapes are employed as the light transmitting regions 14 and an appropriate arrangement thereof produces a bent part 17 of the light absorbing region 13. It is therefore unnecessary to include the pattern of the specific structure 18 as in the first embodiment. As the manufacturing method for the light beam direction control element according to the present embodiment, a process similar to that in the first embodiment illustrated in FIGS. 4A to 4F may be applied, and a similar effect may also be obtained.

Note that the shape and arrangement pattern of the light transmitting region 14 in FIGS. 5A and 5B are mere examples, and any configuration may be employed where the light absorbing region 13 is not in one straight line relative to the X direction and to the Y direction, and where the path of the light absorbing region 13 has a substantially constant width. In this example, with respect to both the X and Y directions, the light absorbing region 13 is divided by the light transmitting regions 14 so as not to be in one linear array. That is, the light transmitting region 14 itself serves as the structure for dividing. Here, though transparent patterns of two different shapes of a square and a rectangle when seen from the above are combined as the light transmitting regions 14 in FIGS. 5A and 5B, combination of three or more shapes of transparent patterns may also be possible. Moreover, transparent patterns crossing to form the L or T shape may also be combined.

Embodiment 3

Figure 6:
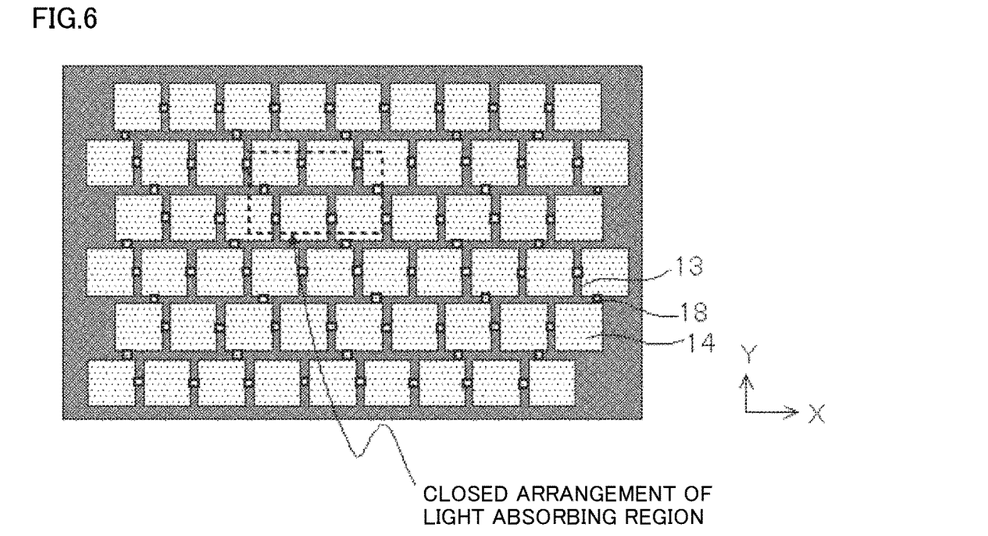
FIG. 6 illustrates the arrangement of a light absorbing region in a light beam direction control element according to the third embodiment of the present invention.

The third embodiment of the present invention will now be described with reference to FIG. 6. FIG. 6 is a plan view of the light beam direction control element according to the third embodiment. The light beam direction control element according to the third embodiment has a closed arrangement of the light absorbing region 13 with respect to the X direction and Y direction (i.e. closed pattern where the light absorbing region is isolated by the structure 18) by utilizing the pattern of the structure 18 which is a base for bending the light absorbing region 13 in the first and second embodiments (particularly the first embodiment illustrated in FIGS. 1 to 3). In this case also, distribution of the stress due to thermal shrinkage of the light absorbent material 23 is attempted, which can prevent the concentration and accumulation of the stress in a specific linear direction (X or Y direction), suppress the occurrence of a warp in the transparent substrate 12, improve the adhesion force between the transparent substrates, and thus enhance the reliability of the light beam direction control element.

Here, in terms of distribution of the stress due to thermal shrinkage, it is desirable that at least two closed arrangement patterns of regions (closed pattern areas) in the light absorbing region 13 are present on the transparent substrate 12. Moreover, when the disposed number of the structures 18 is too large, the area ratio of the light absorbing region 13 is relatively lowered, the light shielding performance as the light beam direction control element (microlouver) is decreased and a desired viewing angle restriction effect cannot be obtained. It is thus desirable to form a requisite minimum number of arrangement patterns of regions closed by the structure 18 (closed pattern areas). Furthermore, in terms of visibility for the display panel viewed through the light beam direction control element, smooth display without discomfort may be attained when the same arrangement pattern of the closed regions (closed pattern area) is repeated in the light absorbing region 13. It is noted that the shape and size of the structure 18 are not limited to the configuration in FIG. 6, as long as the structure 18 is capable of dividing the light absorbing region 13.

Embodiment 4

The fourth embodiment of the present invention will now be described with reference to FIGS. 7A to 7G. FIGS. 7A to 7G illustrate section views of manufacturing steps for the light beam direction control element according to the fourth embodiment. According to the present embodiment, the light absorbing region 13 and the light transmitting region 14 are formed on both substrates to be bonded, further increasing the effect of the present invention. More specifically, the manufacturing method according to the present embodiment includes: a transparent pattern forming step (FIGS. 7A to 7C) of forming transparent patterns 22 serving as light transmitting regions on the first substrate 12 and the second substrate 15; a light absorbent material forming step (FIG. 7D) of filling a gap between the transparent patterns 22 with light absorbent material 23 serving as light absorbing region; an adhesive forming step (FIG. 7E) of forming an adhesive 16 layer on at least one substrate side of the first substrate 12 and the second substrate 15 in which the light transmitting region and the light absorbing region are formed; and a substrate bonding step (FIGS. 7F, 7G) of layering and bonding the transparent patterns of the first substrate 12 and the second substrate 15 using an alignment mark.

The manufacturing method illustrated in FIGS. 7A to 7E is implemented by a method similar to that in the first embodiment, except for the film thickness of the photocurable material 19 serving as the light transmitting region 14 that is substantially half the film thickness in the first embodiment.

Figure 7A:
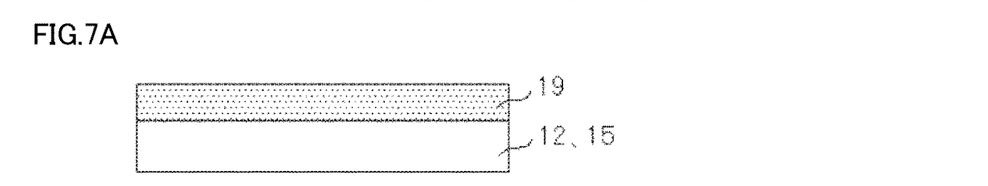
FIG. 7A is a section view illustrating a manufacturing method of the light beam direction control element according to the fourth embodiment of the present invention.
Figure 7B:
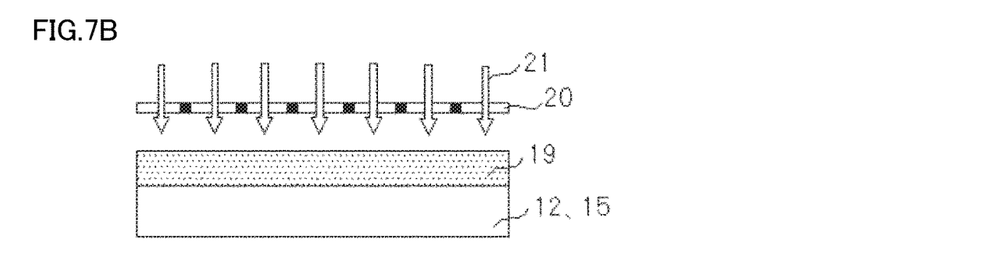
FIG. 7B is a section view illustrating a manufacturing method of the light beam direction control element according to the fourth embodiment of the present invention.
Figure 7C:
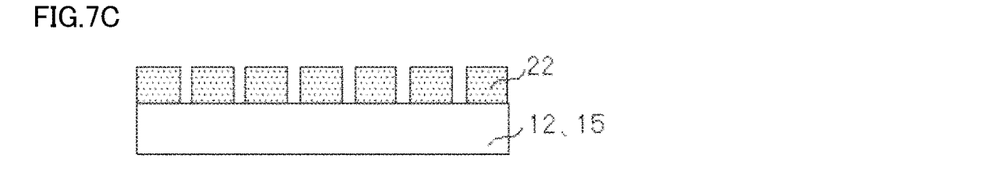
FIG. 7C is a section view illustrating a manufacturing method of the light beam direction control element according to the fourth embodiment of the present invention.
Figure 7D:
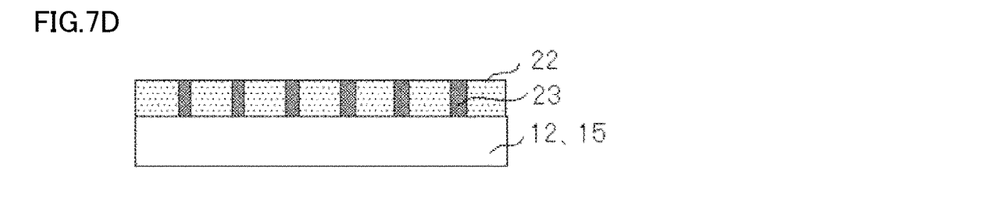
FIG. 7D is a section view illustrating a manufacturing method of the light beam direction control element according to the fourth embodiment of the present invention.
Figure 7E:
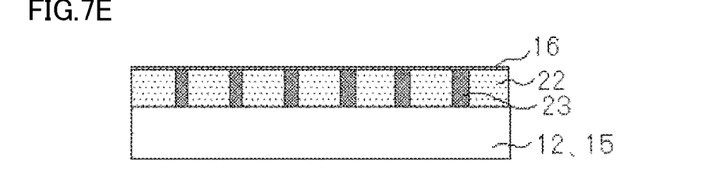
FIG. 7E is a section view illustrating a manufacturing method of the light beam direction control element according to the fourth embodiment of the present invention.
Figure 7F:
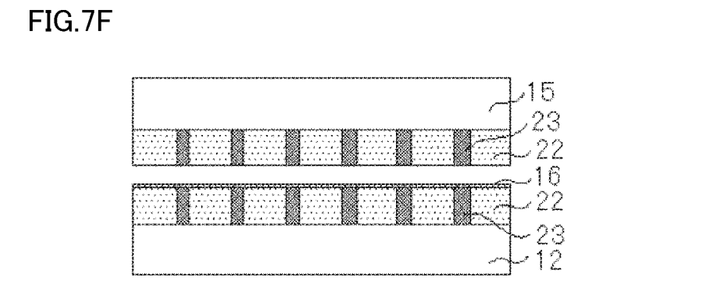
FIG. 7F is a section view illustrating a manufacturing method of the light beam direction control element according to the fourth embodiment of the present invention.
Figure 7G:
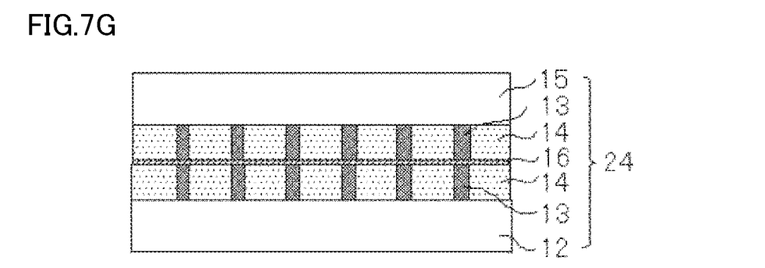
FIG. 7G is a section view illustrating a manufacturing method of the light beam direction control element according to the fourth embodiment of the present invention.
Figure 8:
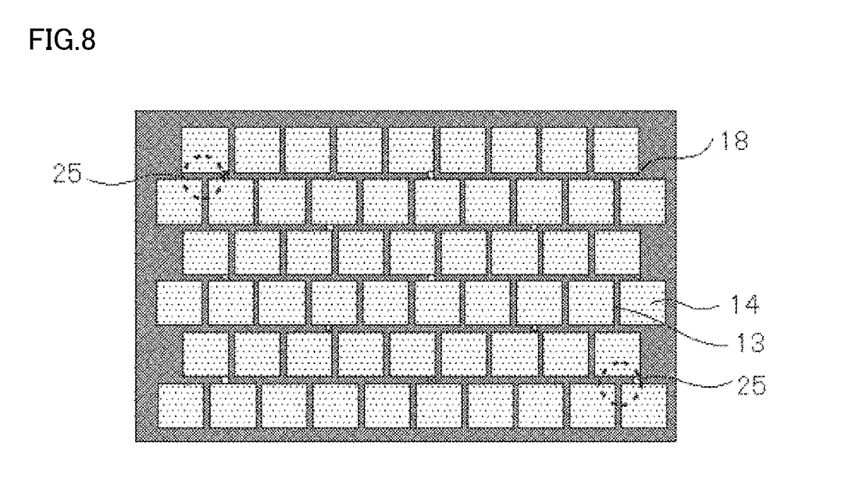
FIG. 8 is a plan view illustrating the arrangement of alignment marks in the light beam direction control element according to the fourth embodiment of the present invention.

Subsequently, as illustrated in FIG. 7F, the substrate of FIG. 7E which has been through up to the adhesive forming step and the substrate of FIG. 7D which has been through up to the light absorbent material forming step are placed so that the film surfaces thereof face each other. Subsequently, as illustrated in FIG. 7G, the substrates are bonded together using alignment marks such that their respective light absorbing regions 13 are aligned with each other. As illustrated in FIG. 8, rectangular portions in the pattern of the light absorbing region 13 near the outer periphery of the transparent substrate may be utilized as alignment marks 25, and the substrates are aligned based on the rectangular portions to be bonded together, and thereafter a baking process is performed at 90° C. for 10 minutes to cure the adhesive 16.

Though the same film thickness of the photocurable material 19 is employed for the substrate of FIG. 7D and the substrate of FIG. 7E, the film thickness of the photocurable material 19 may be different for both substrates. For example, the film thickness of the photocurable material 19 on the substrate where the adhesive layer is formed is reduced, so that the flatness of the upper surfaces of the light transmitting region 14 and the light absorbing region 13 is improved and the adhesive layer may be made with more uniform thickness. Moreover, in the case where the alignment is carried out using the rectangular portions in the pattern of the light absorbing region 13, the edge of the light absorbing region 13 tends to be fuzzy as the film thickness of the photocurable material 19 is increased. The film thickness of the photocurable material 19 may therefore be reduced on the side which is a basis for the alignment, sharpening the edge of the light absorbing region 13.

As has been described above, according to the manufacturing method in the present embodiment, two transparent substrates 12 and 15 on which the light transmitting region 14 and the light absorbing region 13 are formed are bonded together through the adhesive 16 to fabricate the light beam direction control element 24, which can cancel out any warp remaining in the transparent substrates 12 and 15, and can easily attain a transparent pattern with an even higher aspect ratio.

Embodiment 5

Figure 9:
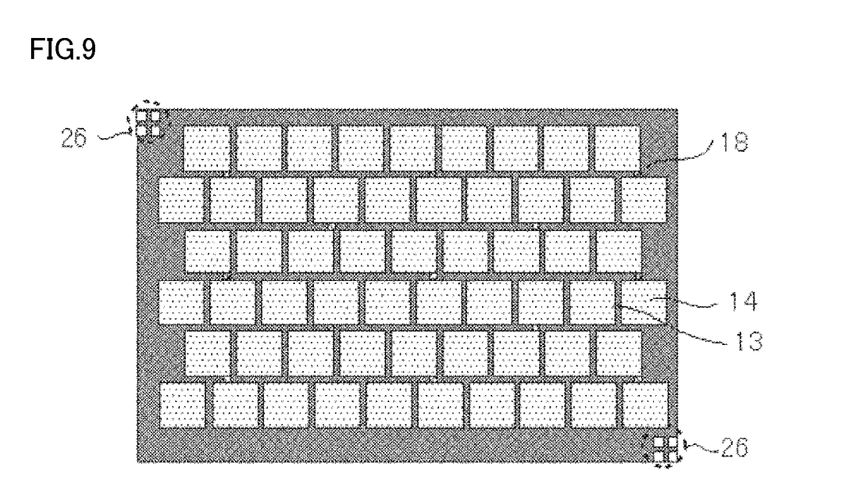
FIG. 9 is a plan view illustrating the arrangement of alignment marks in a light beam direction control element according to the fifth embodiment of the present invention.

The fifth embodiment of the present invention will be described with reference to FIG. 9. The manufacturing method for the light beam direction control element according to the fifth embodiment is similar to that in the fourth embodiment, except for the alignment marks used in bonding both transparent substrates. FIG. 9 is a plan view illustrating the arrangement of alignment marks in the light beam direction control element according to the fifth embodiment. When there is no pattern in the light absorbing region 13 at the outer periphery part of the transparent substrate, or when there is a pattern but is not suitable for a mark because of its curved shape, dedicated alignment marks 26 are inserted at the outer peripheral parts of the transparent substrate and are used for alignment. While the light beam direction control element according to the fifth embodiment performs alignment of both transparent substrates with a method different from that in the fourth embodiment, an effect similar to that in the fourth embodiment may also be obtained.

Embodiment 6

The sixth embodiment of the present invention will now be described with reference to FIG. 10. The manufacturing method for the light beam direction control element according to the sixth embodiment is similar to those for the light beam direction control elements according to the fourth and fifth embodiments, except that the adhesive forming step is eliminated while the light transmitting region and light absorbing region function as an adhesive which is used to bond the transparent substrates together.

Figure 10:
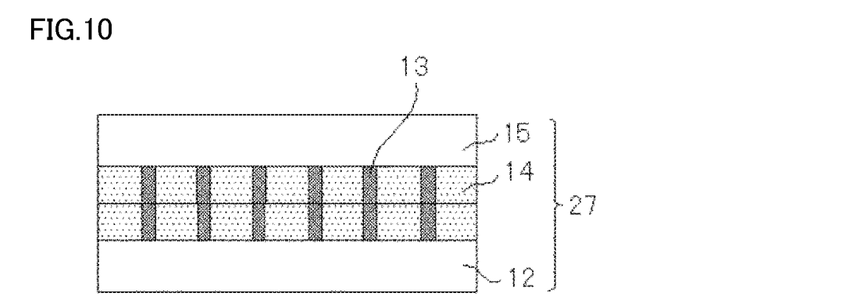
FIG. 10 is a section view illustrating the structure of a light beam direction control element according to the sixth embodiment of the present invention.

FIG. 10 is a section view illustrating the structure of a light beam direction control element 27 according to the sixth embodiment of the present invention. The transparent pattern forming the light transmitting region 14 is subject to post baking at 80° C. for 30 minutes (the temperature is lower than the case with 120° C. for 30 minutes in the first embodiment), and the light absorbent material forming the light absorbing region 13 is subject to baking at 60° C. for 30 minutes (the temperature is lower than the case with 80° C. for 30 minutes in the first embodiment), so as to implement the substrate bonding step while being in a half-cured state. In such a method, the surfaces of the transparent substrate 12 and the transparent substrate 15 that are to be bonded together are made of the same type of material, and thus sufficient adhesion force is generated by full-cure baking at 120° C. for 30 minutes after bonding. Though the described conditions for post baking of the transparent pattern and the baking of the light absorbent material may be employed, any condition may be employed as long as both of the transparent pattern and the light absorbent material are half-cured. While the transparent substrates are bonded together by a method different from that in the fourth or fifth embodiment in the light beam direction control element 27 according to the sixth embodiment, an effect similar to that in the fourth embodiment may be obtained.

Embodiment 7

Figure 11:
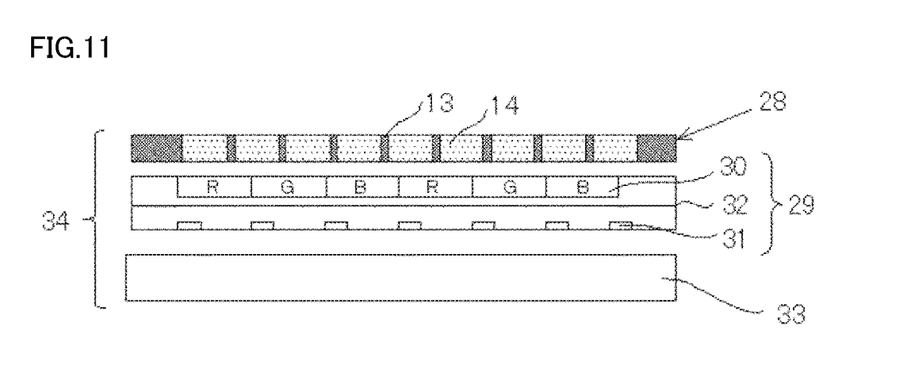
FIG. 11 is a view illustrating a display apparatus in which the light beam direction control element according to the present invention is employed.

The seventh embodiment of the present invention will now be described with reference to FIG. 11. FIG. 11 illustrates a display apparatus in which the light beam direction control element according to the present invention is employed. A display apparatus 34 has a display panel 29 including a substrate on which a color filter 30 is formed as well as a substrate on which active elements 31 such as TFTs (Thin Film Transistors) are formed in matrix, and liquid crystal 32 filling a gap between the substrates; a light source 33 such as a cold cathode fluorescent lamp (CCFL) or a light emitting diode (LED); and the light beam direction control element 28 illustrated in the first to sixth embodiments.

In the case where the light beam direction control element 28 is located at the front surface or the back surface of the display panel 29 which is viewed through the light beam direction control element 28, the image on the display panel 29 may be difficult to be visibly recognized from an oblique direction while it may be recognized from the vertical direction. Though a liquid crystal display type of the display panel 29 is illustrated here, any other display type such as organic electro luminescence (EL) or the like may pose no specific problem.

It is to be noted that the present invention is not limited to the examples described above, but may appropriately be modified for the configuration or manufacturing method of the light beam direction control element without departing from the spirit and scope of the present invention.

The present invention may be applied to a liquid crystal display apparatus used as a display for various types of information processing devices such as a mobile phone, a personal digital assistant (PDA), an automatic teller machine (ATM), a personal computer and so forth.

The invention claimed is:

1. A light beam direction control element, comprising:
   light transmitting regions made of light transmitting material that are arrayed on a substrate; and
   a light absorbing region made of light absorbent material that fills a gap between the light transmitting regions, the light absorbing region restricting a light beam direction of light passing through the substrate,
   wherein the light absorbing region extends in a first direction and a second direction that form a right angle to each other in a substrate plane,
   the light beam direction control element, further comprising:
   a crossing portion where the light absorbing region extending in the first direction and the light absorbing region extending in the second direction cross each other to form an L shape or a T shape; and
   a plurality of structures each of which is different from the light transmitting regions and divides the light absorbing region and each of which is located on a region which is other than the crossing portion and where the light absorbing region extends in the first direction or the second direction,
   wherein the light beam direction control element has a closed arrangement of the light absorbing region which is isolated with respect to the first direction and the second direction and which is formed by the plurality of the structures located on the light absorbing regions and the light transmitting regions.

2. The light beam direction control element according to claim 1, wherein the plurality of structures is made of the same material as the material of the light transmitting region.

3. The light beam direction control element according to claim 1, wherein the light absorbing region is a repetition of the closed arrangement.

4. A display apparatus, comprising:
   a display panel; and
   the light beam direction control element according to claim 1 located on a front face or a rear face of the display panel.

\* \* \* \* \*